Patented May 24, 1932

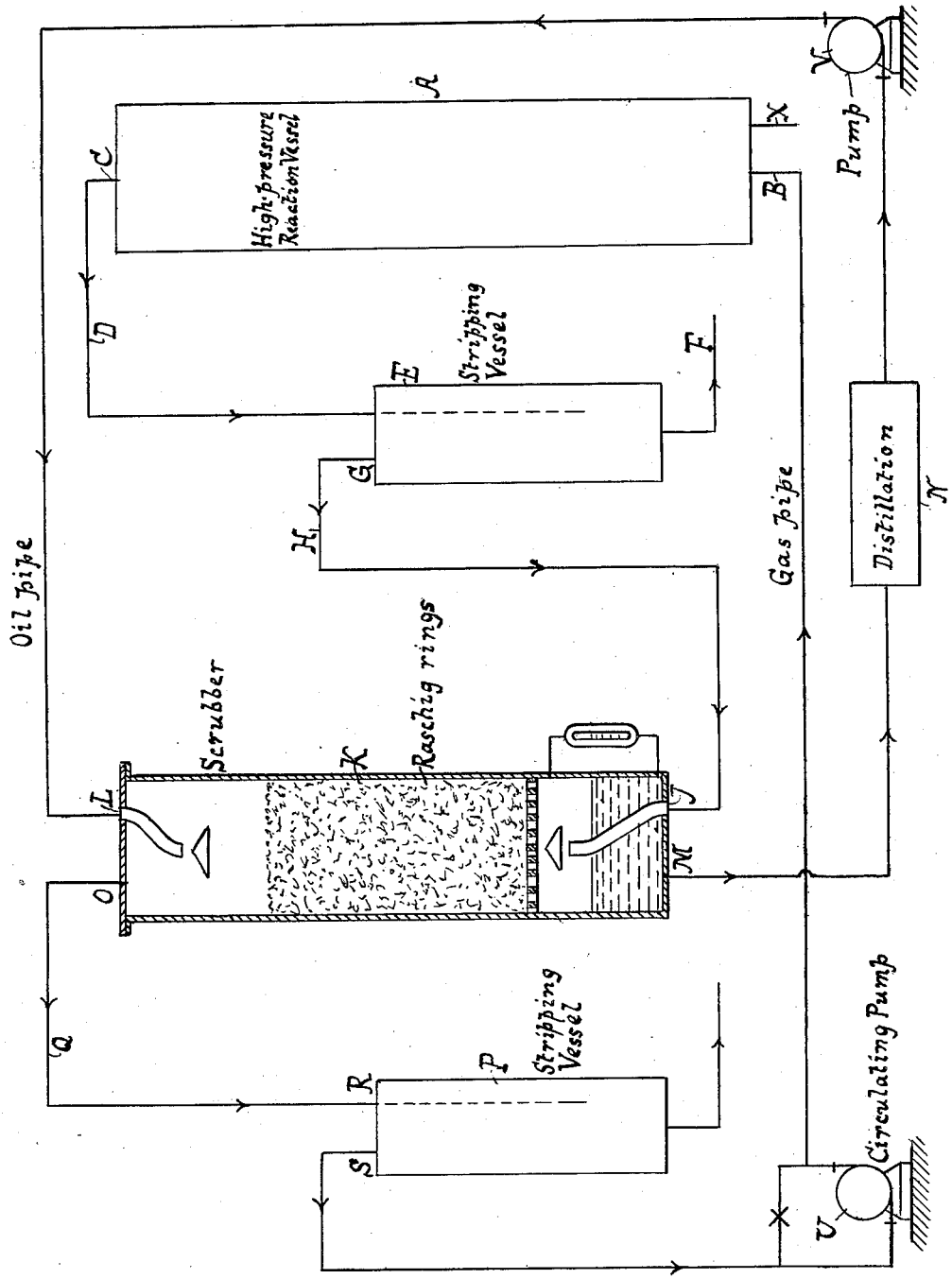

1,859,314

UNITED STATES PATENT OFFICE

MATHIAS PIER, OF HEIDELBERG, AND KARL WINKLER AND KURT WISSEL, OF LUDWIGSHAFEN-ON-THE-RHINE, GERMANY, ASSIGNORS, BY MESNE ASSIGNMENTS, TO STANDARD-I. G. COMPANY, OF LINDEN, NEW JERSEY, A CORPORATION OF DELAWARE

DESTRUCTIVE HYDROGENATION OF CARBONACEOUS MATERIALS

Application filed June 4, 1927, Serial No. 196,630, and in Germany June 11, 1926.

In the destructive hydrogenation, that is the conversion of carbonaceous materials such as substances of the nature of coal, tars, mineral oils, pitches, resins, bitumens, their products of conversion and distillations, residues and the like, into valuable liquid and other hydrocarbons and derivatives thereof, in particular such having a low boiling point, with the aid of hydrogen or gases capable of supplying hydrogen, at higher temperatures and under pressure, gaseous hydrocarbons are also obtained which it is difficult to separate from the hydrogenating gas not consumed by the reaction. This is especially the case when working on an industrial scale, if the concentration in the reaction gases of the products obtained is comparatively low, and the hydrogenating gas must be repeatedly returned over the initial material to be converted. In this process it is of the greatest practical importance, to separate the gaseous hydrocarbons, such as methane, ethane, gaseous olefines, etc., from the unconsumed hydrogenating gases in a simple manner; scrubbing of the gases with oils of higher boiling point has already been proposed for this purpose, but has not proved satisfactory.

We have now found that gasolines and in particular those gasoline-like products which are obtained by the destructive hydrogenation of carbonaceous materials itself, are especially well suited for washing out the gaseous hydrocarbons produced, which are difficult to condense and therefore accumulate in the circulating gas. The absorption coefficients of the benzines for the difficultly condensible hydrocarbons, are considerably higher than those of the heavy or middle oils or other usual scrubbing media. For instance, four times the amount of gaseous hydrocarbons, as was dissolved by a middle oil obtained from mineral oil, was dissolved at room temperature from the circulating gas of a high pressure plant, in which crude mineral oil was being converted in a current of hydrogen into hydrocarbons of low boiling point, by the benzine thus obtained.

The dissolved gases can be again set free from the solvent medium by raising the temperature or releasing the pressure. It may in some cases be useful to effect, by fractional release of pressure, a separation of the gaseous hydrocarbons into different portions, which may then be utilized and treated separately; for instance the hydrogen, which is first disengaged by the release of pressure, may be reintroduced into the cycle after being compressed to the necessary pressure, whereas the gaseous hydrocarbons may be converted by treatment with hydrogen, and the like, at higher temperatures into liquid hydrocarbons.

Our said invention will be further illustrated with reference to the accompanying diagram.

Carbonaceous material is introduced into a high pressure reaction vessel A through the pipe X in which vessel it is subjected to destructive hydrogenation. The hydrogenating gas is introduced into the said reaction vessel by way of the gas pipe B. The hydrogenation products leave the reaction vessel at C and are conveyed by means of a pipe D to a stripping vessel E where the main portion of the liquid products is condensed. The said products are taken off by way of the pipe F. The gases containing more difficultly condensible products are taken off at G and conveyed by way of the pipe H to a scrubber K into which they enter at J. A scrubbing agent which consists of a low boiling hydrocarbon of a gasoline character is introduced into the scrubber at L and is passed over Raschig rings. The greater part of the difficultly condensible products is taken up by the said scrubbing agent. The scrubbing agent emerges from the scrubber at M and is conveyed to a fractionating plant N where it is separated from the aforesaid difficultly condensible products. The scrubbing agent thus recovered is then returned to the scrubber with the aid of a pump V. The reaction gases emerge from the said scrubber at O and are passed by way of the pipe Q into a stripping vessel P into which they enter at R. They are thus free from any vaporous products which may still be present therein. The gases which have been thus treated are taken off from the stripping vessel at S and are returned by way of the pipe T with the aid of the circulating pump U to the high pressure reaction vessel.

What we claim is:

1. In the destructive hydrogenation of carbonaceous materials, the step of removing the gaseous hydrocarbons from the reaction gases by scrubbing the said gases freed from the liquid reaction products with a low boiling hydrocarbon of a gasoline character at a high pressure, then releasing the pressure on the scrubbing medium containing the dissolved gases and thereby effecting release of a definite portion of the scrubbed gases, and reintroducing the said portion back into the system.

2. In the destructive hydrogenation of carbonaceous materials, the step of removing the gaseous hydrocarbons from the reaction gases by scrubbing the said gases freed from the liquid reaction products with a gasoline like product of said destructive hydrogenation at a high pressure, then releasing the pressure on the scrubbing medium containing the dissolved gases and thereby effecting release of a definite portion of the scrubbed gases, and reintroducing the said portion back into the system.

3. In the destructive hydrogenation of carbonaceous materials, the step of removing the gaseous hydrocarbons from the reaction gases by freeing the said gases leaving the reaction vessel from the liquid reaction products, then scrubbing them with a gasoline like product of said destructive hydrogenation at a high pressure, then releasing the pressure on the scrubbing medium containing the dissolved gases to an extent sufficient to release substantially only the hydrogen gas, and reintroducing the said hydrogen gas back into the system.

4. In the destructive hydrogenation of carbonaceous materials, the step of removing the gaseous hydrocarbons from the reaction gases by scrubbing the said gases freed from the liquid reaction products with a low boiling hydrocarbon of a gasoline character at a high pressure, and regeneration of the washing fluid by pressure release in steps, the first fractional release of pressure resulting in disengaging of substantially only hydrogen.

In testimony whereof we have hereunto set our hands.

MATHIAS PIER.
KARL WINKLER.
KURT WISSEL.